March 2, 1948.    J. L. WOODBRIDGE    2,437,145
NONSPILL VENT FOR STORAGE BATTERIES
Filed Sept. 14, 1943

INVENTOR:-
J. LESTER WOODBRIDGE

BY
Augustus B. Stoughton
ATTORNEY

Patented Mar. 2, 1948

2,437,145

UNITED STATES PATENT OFFICE 2,437,145

NONSPILL VENT FOR STORAGE BATTERIES

Joseph Lester Woodbridge, Philadelphia, Pa., assignor to The Electric Storage Battery Company, a corporation of New Jersey Application September 14, 1943, Serial No. 502,300

13 Claims. (Cl. 136—177)

This invention relates to a vent structure for storage batteries of the type which permits the escape of gases from the storage battery cell to the atmosphere when it is in its normal upright position but prevents the escape of liquid from the cell to the atmosphere when it is tilted from the normal upright position or inverted. Such vent structures are commonly called non-spill vents.

It is an object of this invention to provide a new and improved vent structure of this type, which simply and effectively prevents spillage of electrolyte to the atmosphere upon either tilting or complete inversion of the cell.

It is a further object of this invention to provide a non-spill vent construction which is free from mechanical valves and other moving parts, yet effectively prevents spillage of electrolyte to the atmosphere.

It is a still further object of this invention to provide a non-spill vent structure wherein a predetermined quantity of electrolyte is permitted to escape from the cell into a trap chamber to produce conditions under which the escape of additional electrolyte to the trap chamber is prevented so long as the conditions are maintained.

It is a further object of this invention to provide in a non-spill vent structure of this type improved means for insuring the prompt return of the trapped liquid to the cell when the cell is restored to its normal upright position without substantially affecting the predetermined quantity of electrolyte permitted to escape to the trap chamber and the conditions established thereby.

Further objects and advantages of this invention will become apparent as the following detailed description proceeds and the features of novelty which characterize this invention will be set forth in the claims appended to and forming a part of this specification.

In accordance with this invention, the non-spill vent structure comprises a chamber which is supported on the storage battery cover. This chamber is provided with a vent passageway which communicates with the atmosphere and a second vent passageway which communicates with the interior of the cell. The entrances of these vent passageways into the chamber are spaced from each other so as to cause trapping of the electrolyte within said chamber. The entrance of the vent passageway communicating with the storage battery cell is so positioned within the chamber that the flow of liquid from the cell, upon inversion thereof, seals the vent passageway to oppose the flow of air into the cell through this passageway, thus establishing in the cell a partial vacuum proportional to the liquid flowing into the chamber and ultimately producing an equilibrium condition inhibiting further flow. In combination with this construction there is provided ducts of capillary dimensions which are proportioned so that when the cell is inverted any tendency of air to flow through these ducts is opposed and when the cell is in its upright position any liquid within the chamber will be drained back into the cell.

For a more complete understanding of this invention reference should be had to the following description taken in connection with the accompanying drawing in which.

Figure 2:
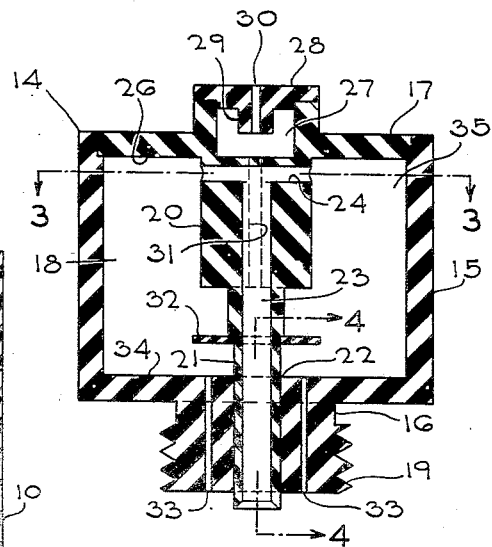
Figure 2 is an enlarged sectional elevation of the non-spill vent structure of this invention, the section being taken on the line 2—2 of Figure 3.
Figure 1:
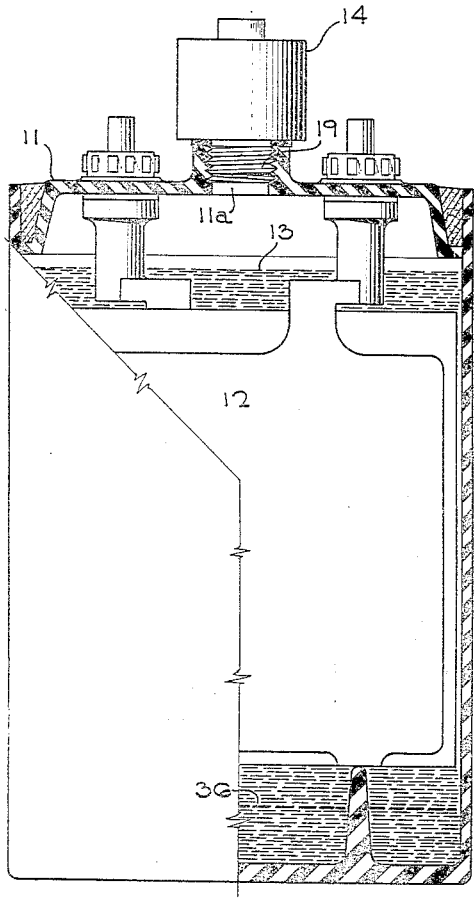
Figure 1 is a sectional elevation of a storage battery cell provided with the improved non-spill vent structure of this invention.
Figure 3:
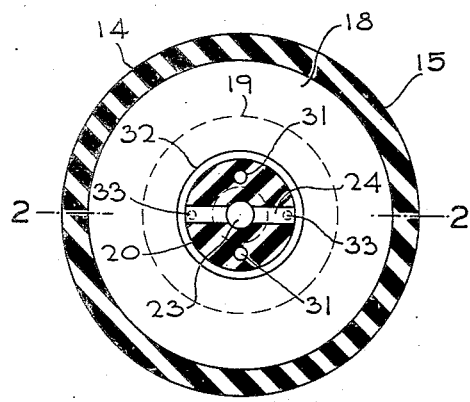
Figure 3 is a horizontal section of the non-spill vent structure of this invention taken on the line 3—3 of Figure 2.

Referring to Figure 1, there is illustrated a storage battery cell of conventional design which comprises a jar or box 10 provided with the usual cover 11 and containing the usual plate assembly 12 and electrolyte, the upper level of which is indicated at 13. The cover 11 is provided with the usual filling opening 11a. Closing the filling opening is the vent plug 14 which, in accordance with this invention, comprises cylindrical walls 15, a base portion 16 and a cover 17 defining a chamber 18. The vent plug 14 is removably secured in the filling opening 11a in the cover 11 as by screw thread engagement 19.

Extending downwardly from the cover 17 is the cylindrical vent member comprising an upper portion 20 and a lower portion 21 of reduced diameter, the latter portion passing downwardly through and making a snug fit in the orifice 22 in the base member 16. Passing axially through the portion 21 is shown a duct 23, opening below into the upper part of the cell and closed at the top except for the lateral or radially extending ducts 24 extending from the top of the duct 23, through the wall of the upper portion 20 into the chamber 18, near its ceiling 26, thus establishing a vent passageway between the interior of the cell and the uppermost portion of the chamber 18.

In the cover 17 is a cavity 27 enclosed by the cap 28 provided with a downwardly projecting boss 29, through which passes the vent passage 30 establishing communication between the cavity 27 and the external air. This provides for trapping and returning to the cell any small amount of liquid which might, under abnormal conditions escape through the vent passages 31, referred to hereinafter. This cavity and cap may not in all cases be necessary.

The upper portion 29 of the vent member extends downwardly to a point about midway of the chamber 18, and passing vertically through this upper portion, externally of the duct 23, are shown two vent passages 31 communicating below with the chamber 18 at about its middle point and above with the cavity 27, thus establishing a vent passageway between the chamber 18 and the external air via vent passages 31, cavity 27, and vent passage 30.

Just below the lower orifices of the vent passages 31 is a disk shaped baffle 32 adapted to prevent any liquid which may be present in the chamber 18 from passing into the vent passages 31 when the cell is inverted.

Through the base portion 16 are shown two drain ducts 33 extending down from the floor 34 of the chamber 18 and opening below into the interior of the cell. These drain ducts are of capillary dimensions and provide for draining back into the cell the liquid which, when the cell is inverted, escapes through the ducts 23 and 24 and is trapped in the upper space 35 of the chamber 18. They also, due to their capillary size and the surface tension developed thereby, oppose the entrance of air into the cell therethrough when the cell is inverted. The method of determining the capillary dimensions of these drains will be set forth hereinbelow.

The broken line 36 of Figure 1 indicates the upper level of the electrolyte when the cell is inverted.

The mode of operation of the structure shown in Figure 1 is as follows:

In the normal upright position of the cell the glasses developed in the cell will be vented via ducts 23 and 24, chamber 18, vent passages 31, cavity 27 and vent passage 30, into the external air. It is to be observed that there is thereby provided a substantially unobstructed vent passageway for normally venting the cell.

When the cell is inverted a certain amount of electrolyte will escape through the ducts 23 and 24 into what will then be the lower space 35 of chamber 18. This liquid immediately covers the outer orifices of the ducts 24 and thus prevents air from passing back into the cell through the duct 23. This escape of electrolyte creates a partial vacuum in the cell, and when sufficient electrolyte has escaped the partial vacuum will prevent further escape. In other words, by the escape of electrolyte from the cell into the chamber 18, the volume of the gas space in the cell will be increased, and the expansion of the gas into this increased volume will reduce its pressure, provided no air is admitted to the cell. A differential of pressure is thus established between the external air and the gas in the cell, and when sufficient electrolyte has escaped this pressure differential will be sufficient to balance the head of liquid between the surface of the trapped liquid in the chamber 18 and the surface of the electrolyte in the inverted cell, and no more liquid will escape. The design is such that the space 35 in the chamber 18 between the ceiling 26 and the lower openings of the ducts 31 will be sufficient to trap this amount of electrolyte. That such a design is quite practical may be seen from the following numerical example:

Assume the internal dimensions of the cell are 5" by 1½" by 8" high. Let the height of liquid in the cell when inverted be 7 inches, and let the distance from the under side of the cell cover to the level of the trapped liquid in the chamber 18 when the cell is inverted be one inch, thus producing a total head of 8 inches to be balanced by the differential of pressure. The pressure of the atmosphere will balance a column of water 407" high, or a column of 1.300 sp. gr. electrolyte 313" high. To balance a head of electrolyte 8 inches high will therefore require a pressure differential 8/313 or 0.0255 of an atmosphere. To produce this differential, the gas in the cell must expand by 0.0255 of its original volume. The original volume of gas was say approximately 6 cu. in., so that the necessary expansion will be .0255×6 or .153 cu. in. This amount of space for trapped liquid can readily be provided in a vent plug of practical dimensions.

As noted above, in order to produce the required pressure differential it is necessary to prevent air from entering the inverted cell. Since the external orifices of the ducts 24 will be covered by the trapped liquid when the cell is inverted, no air will be admitted to the cell through these ducts.

A small amount of liquid may escape through the capillary drains 33 when the cell is first inverted, but as soon as a sufficient partial vacuum is established in the cell this escape will cease. The pressure differential between the partial vacuum in the cell and atmospheric pressure in the chamber, developed to balance the head of liquid between the level of the trapped liquid in chamber 18 and the level of liquid in the cell, will be greater than that required to balance the lesser head of liquid between the orifice of the drain duct 33 at the base of the vent plug and the level of the electrolyte in the inverted cell. Thus there is present a force tending to cause air to flow back into the cell through the drain ducts 33. However the capillary dimensions of the drain ducts are proportioned so that the surface tension developed therein opposes the force tending to produce such air flow and leakage of air into the cell is prevented or substantially inhibited. The pressure tending to cause air flow can readily be determined from the design of the vent plug, being equal to the distance from the level of trapped liquid in the chamber 18 and the base surface of the vent plug. From this value and the well known formula for surface tension the diameter of capillary drain ducts 33 may be determined.

When the cell is restored to its normal upright position, the liquid trapped in the chamber 18 will drain back into the cell through the drain ducts 33. The partial vacuum established in the cell will no doubt have a transient effect on the drain back. More important, however, is the fact that upon reinversion of the cell the liquid seal of ducts 24 is removed and the vent passageway is again open to atmosphere. The liquid will therefore flow through the drain ducts due to the head of liquid in the chamber 18 and the capillary action of the ducts. Since the vent passageway is open to the atmosphere this drain back will be unimpeded by gases escaping from the cell. Since each of these drain ducts is necessarily of limited diameter it is of advantage to provide a plurality of such drains in order to expedite the return of the trapped liquid to the cell.

It is to be noted that should the cell be tilted through an angle slightly more than 90° but not completely inverted, it is possible that one end of duct 24 may not be covered by the liquid escaping from the cell to establish a liquid seal. However, under these conditions the liquid head tending to force liquid out of the cell will be much less than that developed when the cell is completely inverted; hence the amount of partial vacuum required in the cell to prevent further escape will be much less, and the tendency of this partial vacuum to draw air into the cell through the unsealed orifice of duct 24 will be very slight, insufficient to overcome the surface tension at the junction between duct 24 and duct 23. In actual service such a condition would obtain for such a brief period of time as to cause the escape of but a few additional drops of liquid, if any, for which ample margin of safety in the form of surplus volume for trapped liquid would always be provided.

It is advantageous that the walls of the vent ducts 23, 24 and 31 be of material non-wettable by the electrolyte in order to prevent drops of electrolyte from being held in these ducts and thus impeding the venting of gases from the cell. To provide for this, these parts may be molded of polystyrene or other suitable non-wettable material of which a number are well known. It is, however, desirable that the walls of the drain ducts 33 be of material wettable by the electrolyte in order to provide the surface tension as referred to above. This may be accomplished by inserting in ducts 33 capillary glass tubes, as shown in Figure 5, glass being an example of wettable material.

Figure 4:
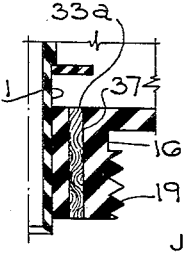
Figure 4 is an enlarged partial sectional elevation showing a modification of the drain passage of the structure shown in Figure 2.

In Figure 4 is shown at 33a a modification of the drain duct 33. The diameter of the duct 33a is greater than that required to provide the necessary surface tension to prevent air from entering the cell when inverted. There is introduced into the duct 33a a thread 37 of filaments of glass wool or similar inert material, preferably material wettable by the electrolyte. These threads fill the duct 33a but at the same time provide a multiplicity of capillary passages between the filaments through which liquid will drain back promptly into the cell but through which the flow of air is opposed by developed surface tension.

Figure 5:
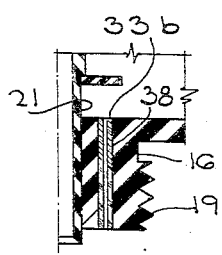

In Figure 5 is shown another illustration in which the base portion 16 is of non-wettable material and the drain duct 33b is lined with a bushing 38 of wettable material such as a capillary glass tube, having a bore of suitable diameter to provide the necessary surface tension.

Figure 6:
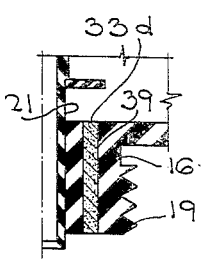
Figures 5 and 6 are views similar to Figure 4 showing other modifications of the drain passage.

In the modification of the drain passage shown in Figure 6, the drain 33d is filled with a portion 39 of porous inert wettable material, such as porous porcelain or a mass of fine glass particles sintered to adhere into a solid porous mass. Other examples of porous inert material wettable by the electrolyte will occur to those skilled in the art. As in the case of the modification shown in Figure 4 in which glass thread is used, a multiplicity of parallel capillary paths is provided which will permit liquid to drain back promptly into the cell but will oppose the exit of gas by reason of the surface tension.

From the foregoing detailed description it will be observed that there is provided in accordance with this invention a simple and effective means for preventing spillage of electrolyte from a tilted or inverted storage battery without the use of mechanical valves, floats or other moving apparatus. It will be further observed that the non-spill feature is achieved without adversely affecting the venting of the battery when it is in its normal position and further, that while the device contemplates a limited discharge of electrolyte from the battery, this discharge is prevented from escaping to the atmosphere and is promptly returned to the cell upon reinversion thereof.

While certain modifications of this invention have been described in detail, other modifications will doubtless occur to those skilled in the art. It is therefore intended in the appended claims to cover all such modifications as come within the true spirit and scope of this invention.

I claim:

1. In a venting structure for a storage battery cell adapted to limit the escape of electrolyte when the cell is inverted by establishing a partial vacuum in the cell said structure including a vent passage from the cell terminating in and near the top of a chamber for trapping escaped electrolyte and a drain passage from the chamber into the cell, the combination of means for preventing the entrance of air into the cell when inverted comprising means for establishing a liquid seal by the escaped electrolyte at the exit terminus of the vent passage and the establishment of liquid surface tension in the drain passage.

2. In a non-spill vent structure for a storage battery cell the combination of a chamber for trapping electrolyte, a venting duct terminating at one end in the cell and at its opposite end in said chamber at a point near the top thereof adapted to produce a liquid seal therefor by the trapped liquid when the cell is inverted, means for venting said chamber to the atmosphere, and a drain of capillary dimensions for returning trapped liquid to the cell, said drain of capillary dimensions serving to develop surface tension to oppose entrance of air therethrough into the cell when said cell is inverted.

3. A non-spill vent structure for a sealed storage battery cell comprising a chamber removably supported on said cell to receive electrolyte upon inversion of said cell, a vent passageway within said chamber communicating at one end with said cell and at its opposite end with said chamber near the top thereof, said end communicating with said chamber being positioned to be sealed by liquid flowing through said passageway into said chamber upon inversion of said cell, a second vent passageway communicating at one end with the atmosphere and at its opposite end with said chamber, said opposite end being spaced from said end of said first passageway communicating with said chamber so that liquid flowing into said chamber will not cover said opposite end, whereby liquid will be trapped in said chamber, and means for draining the trapped liquid back into said cell upon reinversion of said battery, said means comprising ducts of capillary proportions adapted to oppose by developed surface tension the flow of air therethrough into said cell during inversion of said cell.

4. In combination with an invertible storage battery having liquid electrolyte enclosed in a container having a cover with a filling opening therein, of a non-spill venting structure comprising a closed chamber defined by side walls, a top wall and a bottom wall, means for removably mounting said chamber in said filling opening so that said chamber extends above said cover, a first vent passageway having one end communicating with said cell and its opposite end terminating adjacent the top wall of said chamber for venting said battery to the upper portion of said chamber, a second vent passageway having one end communicating with the atmosphere and its opposite end communicating with said chamber below the opening into said chamber of said first vent passageway so as to form a trapping space for liquid escaping through said first vent passageway upon inversion of said cell, and duct means of capillary proportions for draining said trapped liquid into said cell upon the reinversion thereof, said capillary duct means adapted to develop surface tension when said cell is inverted to oppose the flow of air therethrough into said cell.

5. In combination with an invertible storage battery having liquid electrolyte enclosed in a container having a cover with a filling opening therein, of a non-spill venting structure comprising a closed chamber defined by side walls, a top wall and a bottom wall, an externally threaded projection extending from said bottom wall and cooperating with said filling opening to support said chamber removably above said cover, a vent passage extending through said extension and opening into said chamber near the top wall thereof, a second vent passage communicating with the atmosphere and opening into said chamber substantially below said opening of said first vent passage, whereby upon inversion of said cell said first vent passage will be closed to the passage of air by a liquid seal formed by liquid escaping from said cell through said first vent passage and the quantity of liquid escaping will be thereby limited and will be trapped in said chamber between the openings of said first and second vent passages, and at least one capillary duct in said extension adjacent said first vent passage for rapidly draining said trapped liquid into said cell when said cell is reinverted.

6. In combination with an invertible storage battery having liquid electrolyte enclosed in a container having a cover with a filling opening therein, of a non-spill venting structure comprising a closed chamber defined by side walls, a top wall and a bottom wall, means for removably mounting said chamber in said filling opening so that said chamber extends above said cover, a vent passageway extending through said mounting means and having one end communicating with said cell and its opposite end terminating adjacent the top wall of said chamber, a second vent passageway extending through said top wall and having one end communicating with the atmosphere and its opposite end communicating with said chamber below the opening into said chamber of said first vent passageway so as to form a trap for liquid escaping into said chamber upon inversion of said cell, duct means extending through said mounting means adjacent said first vent passageway for draining said trapped liquid into said cell upon the reinversion thereof, and insert means within said duct means providing openings of capillary proportion for opposing the flow of air into the cell through said means upon inversion of said cell and for facilitating the draining back of said trapped liquid upon reinversion of said cell.

7. The combination as set forth in claim 6 in which said insert means comprises a plurality of strands of wettable acid-resistant fibrous material.

8. The combination as set forth in claim 6 in which said insert means comprises a glass tube of fine bore.

9. The combination as set forth in claim 6 in which said insert means comprises a plug of wettable porous material.

10. In a non-spill venting structure for a storage battery cell, the combination of a chamber having a floor and a ceiling, a vent duct communicating below with the interior of the cell and above with the chamber adjacent the ceiling, a second vent duct communicating below with the chamber intermediate the floor and ceiling and above with the external atmosphere, and drain means of capillary dimension extending from the chamber at the floor to the interior of the cell.

11. In a non-spill venting structure for a storage battery cell containing electrolyte, the combination of a chamber having a floor and a ceiling, a vent duct defined by walls of material non-wettable by the electrolyte, said duct communicating below with the interior of the cell and above with the chamber adjacent the ceiling, a second vent duct communicating below with the chamber intermediate the floor and ceiling and above with the external atmosphere, and a drain duct of capillary dimensions extending from the chamber at the floor to the interior of the cell.

12. In a venting structure for a storage battery cell containing electrolyte the combination of a chamber defined by lateral walls, a floor and a ceiling, a vent duct communicating below with the interior of the cell and above with the chamber adjacent the ceiling, a second vent duct communicating below with the chamber intermediate the floor and the ceiling and above with the external atmosphere, and a drain duct of capillary dimensions extending from the floor to the interior of the cell, said drain duct defined by walls of material wettable by the electrolyte.

13. A non-spill vent structure for a sealed storage battery cell having a closure, comprising a chamber supported on said closure for receiving electrolyte when said cell is inverted, a cover for said chamber, a tubular member depending from said cover and extending through said chamber and into said cell, said tubular member having a first vent passageway open at one end to the interior of said cell and at its opposite end through radial ducts to the interior of said chamber near its top and having a second vent passageway defined by axial ducts having one end communicating with said chamber below said radial duct and the opposite end communicating with the atmosphere through said cover structure, and drain means of capillary dimensions extending from the chamber to the interior of the cell.

J. LESTER WOODBRIDGE.

REFERENCES CITED

The following references are of record in the file of this patent:

UNITED STATES PATENTS

| Number | Name | Date |
| --- | --- | --- |
| 572,438 | Moffat | Dec. 1, 1896 |
| 675,419 | Sittig | June 4, 1901 |
| 1,149,983 | Staudt | Aug. 10, 1915 |
| 1,605,020 | Woodbridge | Nov. 2, 1926 |
| 2,070,979 | Vanek | Feb. 16, 1937 |

FOREIGN PATENTS

| Number | Country | Date |
| --- | --- | --- |
| 20,891 | British | 1910 |
| 128,458 | British | June 26, 1919 |
| 319,198 | British | Sept. 17, 1929 |
| 464,282 | British | Apr. 12, 1937 |